July 14, 1925.
G. R. SIEGRIST
1,545,981
LUBRICATING SYSTEM
Filed Dec. 5, 1923
3 Sheets-Sheet 1
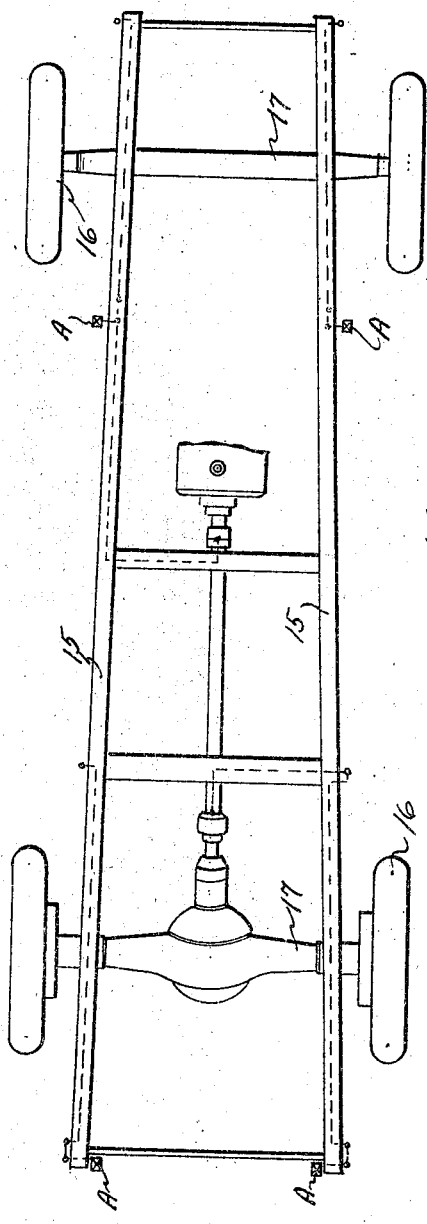
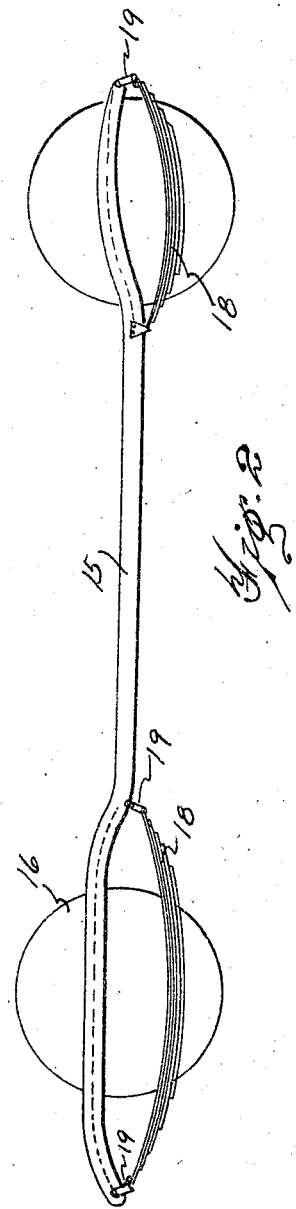
INVENTOR.
BY George R. Siegrist
Ralzemond A. Parker
ATTORNEY.

July 14, 1925.
G. R. SIEGRIST
1,545,981
LUBRICATING SYSTEM
Filed Dec. 5, 1923
3 Sheets-Sheet 2
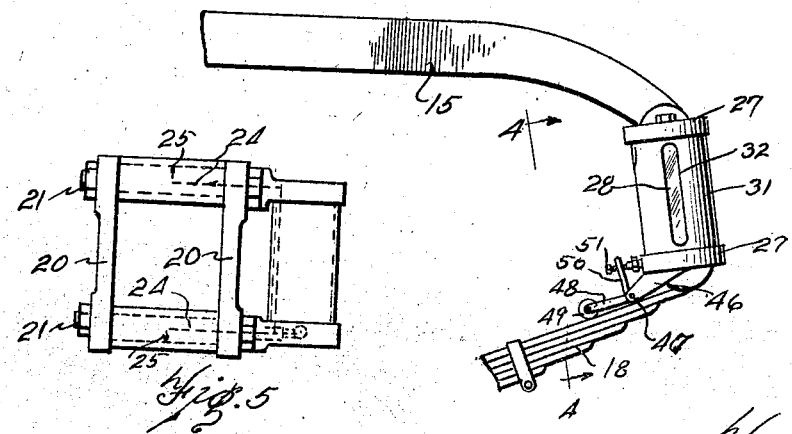
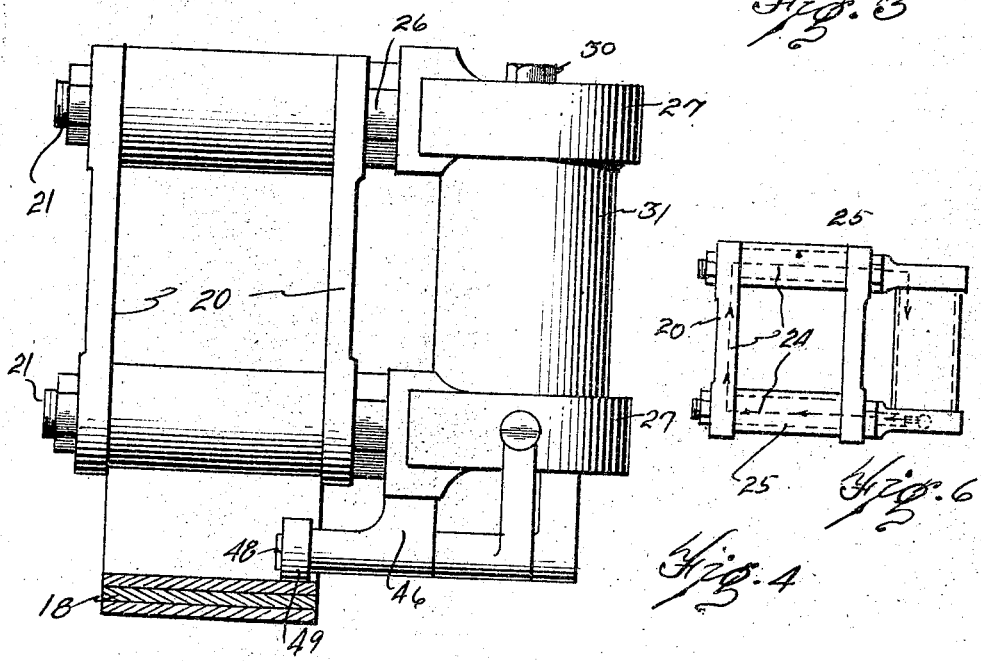
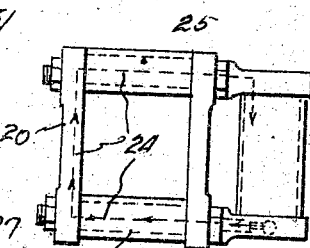
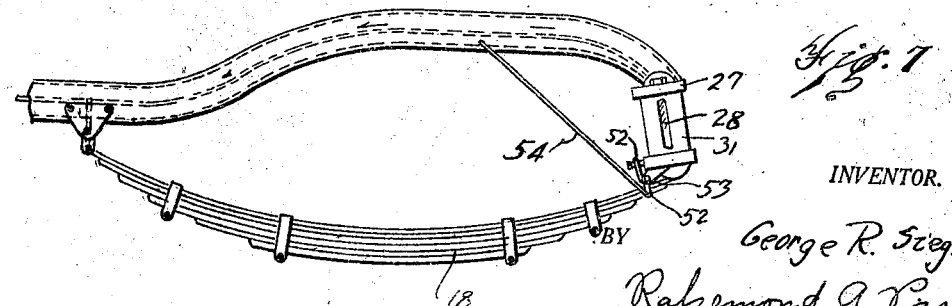
INVENTOR.
George R. Siegrist
BY Ralzemond A. Parker
ATTORNEY.

July 14, 1925.  
G. R. SIEGRIST  
LUBRICATING SYSTEM  
Filed Dec. 5, 1923  
1,545,981  
3 Sheets-Sheet 3
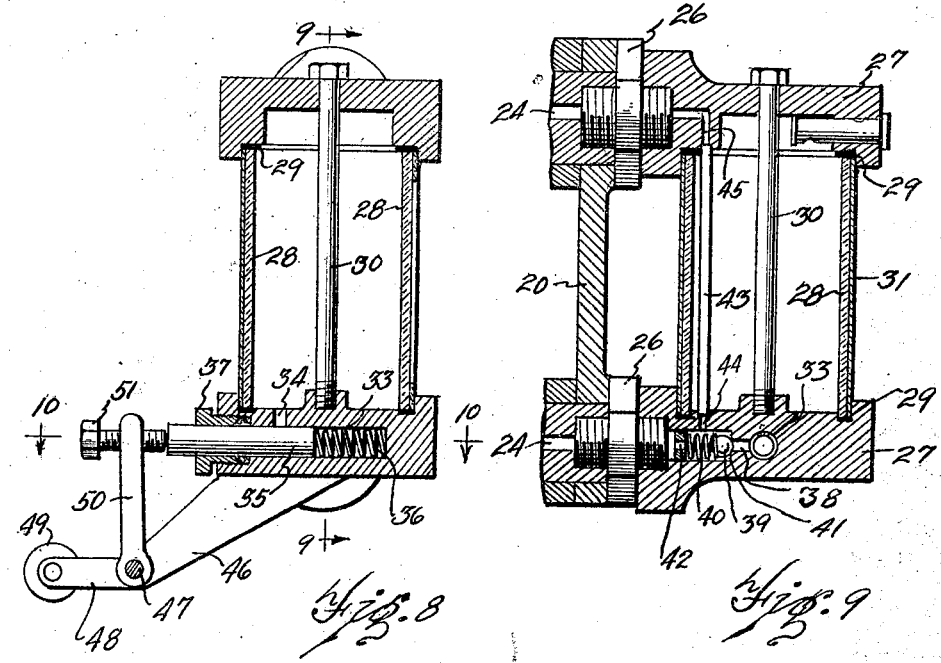
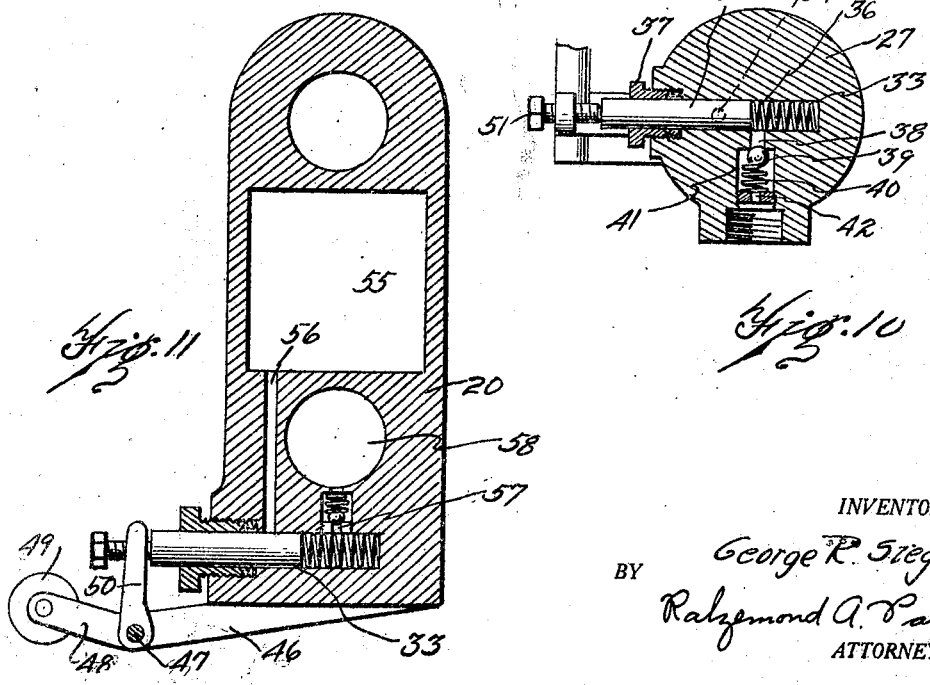
INVENTOR.  
George R. Siegrist  
BY Rahymond A. Parker  
ATTORNEY.

Patented July 14, 1925.

1,545,981

UNITED STATES PATENT OFFICE.

GEORGE R. SIEGRIST, OF PORT HURON, MICHIGAN.

LUBRICATING SYSTEM.

Application filed December 5, 1923. Serial No. 678,614.

*To all whom it may concern:*

Be it known that I, GEORGE R. SIEGRIST, a citizen of the United States, residing at Port Huron, county of St. Clair, State of Michigan, have invented a certain new and useful Improvement in Lubricating Systems, and declare the following to be a full, clear, and exact description of the same, such as will enable others skilled in the art to which it pertains to make and use the same, reference being had to the accompanying drawings, which form a part of this specification.

My invention relates to improvements in vehicle chassis lubrication.

In the lubrication of a vehicle chassis it has heretofore been a common practice to provide oil cups or grease cups for each part to be lubricated. These cups are kept filled with lubricant adapted to discharge to the wearing parts. In many instances the lubricant was applied directly to the wearing parts. Lubrication has also been accomplished by providing a lubricant storage receptacle, frequently disposed in proximity to the engine, having a separate conduit leading therefrom to each part to be lubricated. A pump was provided, driven either from the engine or operated manually, by means of which lubricant was drawn from the storage receptacle and forced through the conduits leading to the respective parts to be lubricated.

The last-named system was highly expensive and subject to considerable mechanical difficulty and breakage. The first-mentioned system, which is in almost universal use, requires constant attention and is, therefore, much neglected and productive of a great deal of annoyance.

I provide a pumping device associated with each of a selected number of conveniently and pivotally disposed spring shackles, which pumping device communicates with a plurality of parts to be lubricated, which parts are grouped about the particular shackle to distribute lubricant to such parts. This pumping device is so constructed and operatively connected with the shackle and the parts to which the shackle is attached as to be operated by the movement of the shackle relative such part to discharge lubricant under pressure to the shackle and to the parts grouped about the shackle to be lubricated.

An important feature is the provision of a lubricant distributing device consisting of a container for lubricant and an impeller associated with a shackle and a part to which the shackle is pivoted to be actuated by the movement of the shackle relative such part to lubricate the shackle by forcing lubricant under pressure thereto.

In the drawings,—

Figure 1 is a plan view of an automobile chassis equipped with my invention.

Fig. 2 is a side elevation of the chassis exhibited in Fig. 1.

Fig. 3 is a side elevation of my invention attached to a spring shackle showing a portion of the spring and vehicle frame in elevation.

Fig. 4 is a view taken on line 4—4, Fig. 3, being at right angles to the view of Fig. 3.

Fig. 5 is a diagrammatic view showing the course of travel for lubricant to the spring shackle.

Fig. 6 is a similar diagrammatic view of a modified form of construction.

Fig. 7 is a side elevation taken from the same point as Fig. 3 showing a slightly modified different form of construction for operating my pumping mechanism.

Fig. 8 is a cross-sectional view taken through my lubricant pump.

Fig. 9 is a vertical cross-sectional view taken through a lubricant pump at right angles to the view in Fig. 8.

Fig. 10 is a horizontal sectional view taken on line 10—10 of Fig. 8.

Fig. 11 is a vertical sectional view through a portion of a spring shackle showing a slightly modified form of construction.

In Fig. 1, I have indicated an automobile chassis in plan having side frame members 15 supported by wheels 16 carried by axles 17 secured to the frame by springs 18. These springs are connected to the frame by suitable spring shackles indicated in assembly as 19. The spring shackles swing about their pivotal connections with the frame or spring and I make use of this swinging movement to actuate suitable pumping mechanism which I provide in connection with each one of a selected number of conveniently disposed shackles. This pumping mechanism comprises a lubricant container and an impeller connected with the shackle to be actuated by the movement thereof.

Each shackle, using the term in the broad general sense, comprises side members 20 connected at opposite ends by shackle bolts 21, which bolts are cored out at 24 to provide lubricant passageways. One of the side plates may be cored out if desired, as appears in Fig. 6, in dotted line, also indicated by the reference numeral 24, to provide a communicating passageway between the cored out passageways through the shackle bolts. I have shown these cored out passageways as having outlets 25 leading to the wearing surface of the bolts to lubricate the bolts.

My pumping device is attached to one side of the shackle and is here shown as secured to the ends of the two shackle bolts by screw-threaded couplings 26.

Each pumping mechanism comprises end pieces 27 between which is supported a tubular section 28 and seating in annular recesses in opposite faces of the end pieces upon suitable gaskets 29. The two end pieces are held together by a bolt 30 which clamps the end pieces securely against both ends of the tubular section 28. I have shown this container as consisting of a glass tubular section 28 enclosed within a metal casing 31 cut away at 32 to indicate the lubricant content of the container. This tubular member serves as a lubricant carrying receptacle and is of suitable size to carry the amount of lubricant desired.

My improved pumping mechanism comprises a pump chamber 33 which is formed in one of the end pieces 27 and communicates with the container by means of the passageway 34 to receive lubricant therefrom. A plunger 35 is disposed in the pump chamber held outwardly by means of a spring 36 and a packing nut 37 is provided to make a tight joint with the plunger. This pump chamber has a discharge opening 38 normally closed by a check valve 39 held in position by a spring 40, which opening 38 leads to the secondary chamber 41. This chamber 41 has a discharge 42 through a suitable packing to the interior of the tubular coupling 26 and therefrom to the passageway 24 in the shackle bolt.

In Fig. 9, I have shown, in section, a device such as illustrated in diagram in Fig. 5, in which the outlet from the chamber 41 is by way of two branches one leading to each shackle bolt and in such construction a tube 43 leads from an outlet 44 from the chamber 41. This tube extends to the upper end piece 27 which is cored out at 45 to communicate with the tubular coupling 26 to carry lubricant to the upper shackle bolt. In this construction the passageway through each shackle bolt turns to discharge at the outer wearing surface of the bolt and there is no return of the lubricant to the receptacle.

In Fig. 6, I have shown in diagram a circulating system provided with outlets for discharge of lubricant to the wearing parts and providing for the return of lubricant to the container and the circulation of lubricant through the system, and in such construction the tube 43 and opening 44 is omitted and the lubricant flows in the direction of the arrows, and passageway 24 is cored out through a side piece 20 to provide for the passage of lubricant from one bolt to the other.

To operate the plunger 35 different types of mechanism may be provided adapted to be actuated by the movement of the shackle. In Figs. 3, 4, 8 and 11, I show the lower end piece 37 provided with an angular support 46 which serves as a bearing for a pin 47 to one end of which pin is secured a lever arm 48, the outer end of which arm carries a roller 49 that is adapted to ride on the upper surface of the spring 18. On the opposite end of the pin 47 is mounted a lever arm 50 which with the lever arm 48 and the pin 47 forms what corresponds to a bell crank lever. The lever arm 50 carries an adjustable stop 51 which impacts the end of the plunger 35 to drive the same inwardly against the resistance of spring 36. The swinging movement of the shackle causes the spring 18 to rise and fall, which through the roller 49, lever arm 48, pin 47, lever arm 50 and stop 51, forces the plunger 35 inwardly against the resistance of spring 36. Therefore, the rise and fall of the spring produces a pumping action which draws lubricant from the container into the pump chamber and forces it from the pump chamber, past the ball and check valve 39 to parts to be lubricated. By this means it is possible to force lubricant to parts desired and to develop sufficient pressure to overcome resistance offered to the passage of the lubricant by encrustation or fouling of the passageways through which the lubricant must flow.

I show in Fig. 7 a modified form of construction for producing the pumping action. In this construction I pivot to the bracket 46 by means of a pin 53 a lever arm 52. This lever arm is shown as extending above and below the pivot point. At the lower end it is connected by link 54 with the frame member 15. Swinging movement of the shackle causes the lever to oscillate about its pivot point and operate the piston or plunger 35.

In Fig. 11, I have shown a second modified form in which one of the side pieces 20 has been recessed at 55 to provide a container for lubricant which has a discharge 56 leading to the pump chamber 33. The discharge from the pump chamber is at 57 to a secondary chamber 58 and from this secondary chamber through the system as above described. The only difference between this construction and the construction heretofore described is that an enlarged side piece is provided which is cored out to form a receptacle for lubricant.

I have described my invention as provided with lubricant passageways leading to the parts of the shackle to which the device is attached to lubricate the shackle. I have also shown a lubricating circulation system in which lubricant returns to the container in addition to the system in which the lubricant does not return to the container. It is an important purpose of my invention, however, to adapt my form of lubrication to lubricate a vehicle chassis and attach my improved pumping mechanism to a selected number of suitably located shackles and provide lubricating conduits leading from the pump to the group of parts to be lubricated located in the immediate vicinity of the lubricating device. By this form of construction I can lubricate the entire chassis and provide lubrication with a minimum provision of lubricant passageways and from a minimum number of suitably disposed shackles. The parts to be lubricated are naturally grouped at the four corners of the chassis and in the plan view of Fig. 1 I have shown at "A" lubricating devices so disposed in proximity the shackles located at such points as to be operated therefrom. Dotted lines are used to indicate conduits leading from these lubricating devices to suitably arranged groups of parts in the vicinity of each lubricating device to lubricate such parts from the cored out openings through the shackle members. A suitable conduit such as copper tubing could be provided to extend along the frame of the chassis to the next part to be lubricated.

What I claim is:

1. In a lubricating system, a vehicle chassis having a supporting spring connected thereto for movement relative thereof, a part to be lubricated, a lubricant container, pump mechanism comprising a pump chamber communicating with the container to receive lubricant therefrom and with the part to be lubricated to discharge lubricant thereto and lubricant impelling mechanism associated with the spring and a part of the chassis relative which the spring is movable, to be actuated by the movement of the spring relative to such part to draw lubricant from the container into the pump chamber and force the same therefrom to the part to be lubricated and means to prevent the return flow of lubricant from the pump chamber to the container.

2. In a lubricating system for a road vehicle, a chassis having a supporting spring and a part to be lubricated, a container for lubricant, pump mechanism comprising a pump chamber connected with the container for lubricant to receive lubricant therefrom and with the part to be lubricated to discharge lubricant thereto, and lubricant impelling mechanism operable by the relative movement of the spring and a part of the chassis to which the spring is attached produced by the travel of the vehicle over the road to draw lubricant from the container into the pump chamber and force it therefrom to the part to be lubricated.

3. In a lubricating system for a vehicle having a frame member, a spring, a shackle connecting the spring to the frame member for pivotal swinging movement, said shackle having side pieces joined together by shackle bolts, a lubricant container carried by one of said side pieces; pump mechanism comprising, a pump chamber communicating with the lubricant container by means of a valve controlled passageway and having a valve-controlled outlet leading to the shackle bolts, pressure developing mechanism operable by the swinging movement of the shackle to draw lubricant from the container into the pump chamber and force the lubricant therefrom under pressure through the valve-controlled outlets to the shackle bolts.

4. In a lubricating system for a vehicle having a spring, a shackle supporting one end of the spring for pivotal swinging movement, a lubricant container, lubricant pumping mechanism comprising a pump chamber communicating with the container to receive lubricant therefrom and having a valve-controlled discharge opening, and pressure developing mechanism communicating with the shackle to be operatively actuated by the swinging movement thereof operable to draw lubricant from the container into the pump chamber and force the same under pressure through the valve-controlled discharge outlet to the shackle bolts.

5. In a lubricating system for a vehicle having a spring shackled thereto, a lubricant container, pump mechanism comprising, a pump chamber communicating with the lubricant container to receive lubricant therefrom, pressure developing mechanism operable by the swinging movement of the shackle relative to a part to which it is connected to draw lubricant from the container into the pump chamber and force the same under pressure therefrom through a valve-controlled outlet to parts to be lubricated.

6. In a lubricating system for a vehicle having a spring connected thereto by means of a spring shackle for swinging pivotal movement, a lubricant container, pump mechanism comprising a pump chamber having a valve-controlled passage-way communicating with the container and a valve-controlled outlet leading to parts to be lubricated, a plunger disposed within the chamber adapted by its reciprocation to draw lubricant from the container into the pump chamber and discharge it through the valve-controlled outlet, and means operatively connecting the plunger with a part to which the shackle is attached to actuate the plunger as the shackle pivots about its connection with such attached part.

7. In a lubricating system for a vehicle, a chassis, a spring connected thereto, a part to be lubricated, a lubricant container, pump mechanism comprising a pump chamber communicating with the container and having a valve-controlled discharge outlet to said part to be lubricated, and pump mechanism operable by the relative movement of the spring and chassis produced by the travel of the vehicle to feed lubricant under pressure to the parts to be lubricated.

8. In a lubricating system for a vehicle having a spring connected thereto by means of a spring shackle, a lubricant container, pump mechanism comprising a pump chamber communicating with the container to receive lubricant therefrom and having a discharge outlet, and pressure developing mechanism operable by the swinging movement of the shackle relative a part to which it is connected to draw lubricant from the container into the pump and force the same through the outlet therefrom, such shackle having a lubricant passageway extending from the outlet of the pump chamber through parts to be lubricated to the lubricant container.

9. In a lubricating system for a vehicle having a spring, a spring shackle comprising side pieces and shackle bolts joining said side pieces pivotally connecting the spring with the vehicle, pump mechanism comprising a lubricant container, a pump chamber communicating therewith to receive lubricant therefrom and having a discharge outlet, impelling mechanism operable by the swinging movement of the shackle relative a part to which it is connected to draw lubricant from the container into the pump chamber and drive the same through the discharge outlet therefrom, a lubricant passageway extending from the discharge outlet to the shackle and returning to the container and having outlets to parts to be lubricated.

10. In a lubricating system for a spring shackle, a shackle comprising opposed side pieces, a pair of shackle bolts joining said side pieces, a part to which one shackle bolt is connected, a movable part to which the other shackle bolt is connected so the shackle has a permitted swinging pivotal movement, a lubricant container, pumping mechanism communicating with the container and having lubricant impelling mechanism operable by the pivotal swinging movement of the shackle relative to a part to which it is connected to create a depression within the pump chamber to draw lubricant from the container, said pumping mechanism having a discharge outlet for lubricant and means to prevent the return flow of lubricant to the container, said shackle having a lubricant passageway extending from the discharge outlet of the pumping mechanism through the shackle and communicating with the part to be lubricated.

11. In a lubricating system for a vehicle chassis having a supporting spring and a part to be lubricated, a lubricant container, pump mechanism comprising a pump chamber communicating with the container to receive lubricant therefrom and having a discharge to the part to be lubricated, and lubricant impelling mechanism connected with the spring and a part of the chassis relative which the spring is movable to be actuated by the movement of the spring relative such part to draw lubricant from the container into the pump chamber and force the same therefrom under pressure to the part to be lubricated.

12. In a lubricating system for a vehicle having a spring, a spring shackle connecting the spring to the vehicle and having a pivotal swinging movement, lubricant pumping mechanism carried by the shackle comprising a container for lubricant, a pump chamber communicating therewith to receive lubricant therefrom having a valve-controlled discharge outlet, and impelling mechanism having a part adapted to ride on the spring to be actuated by the swinging movement of the shackle to draw lubricant from the container and force the same through the outlet under pressure.

13. In a lubricating system for a vehicle chassis having a supporting spring, a spring shackle connecting the spring to the chassis for pivotal swinging movement, a part to be lubricated, and pump mechanism having a discharge leading to the part to be lubricated and provided with a lubricant impelling device operable upon swinging movement of the shackle to force lubricant to the part to be lubricated and adjustable to vary the pump action of the impelling mechanism.

14. In a lubricating system for a vehicle having a spring, a spring shackle connecting the spring to the vehicle and consisting of side pieces joined together by shackle bolts, one of said side pieces provided with a lubricant container, a pump chamber communicating therewith to receive lubricant therefrom and having an outlet for lubricant and means to prevent the return flow of lubricant to the container, and lubricant impelling mechanism having connection with a part to which the shackle is attached for operation upon swinging movement of the shackle relative such part to draw lubricant from the container into the pump chamber and force it therefrom under pressure.

15. In a lubricating system for a vehicle, a frame member, a spring one end of which is connected to the frame member by means of a spring shackle, a lubricant container, a lubricant pumping mechanism communicating with the container to receive lubricant therefrom and having a valve-controlled discharge outlet for lubricant and provided with lubricant impelling mechanism operable by the pivotal swinging movement of the shackle relative a part to which it is connected to draw lubricant from the container and force it through the outlet under pressure, and a conduit for lubricant leading from such discharge outlet through the shackle and to adjacent parts of the vehicle to distribute lubricant thereto.

16. In a lubricating system for a vehicle, a frame member supported by a spring, a spring shackle connecting one end of the spring to the frame member for swinging pivotal movement, a lubricant container, pump mechanism communicating with the container and having a discharge outlet for lubricant and connected to the shackle and one of the parts to which it is attached to operate to draw lubricant from the container through the pump mechanism and discharge it therefrom under pressure upon swinging movement of the shackle relative such part, and a conduit for lubricant leading from the discharge outlet of the pump mechanism to parts of the vehicle in the locality of the shackle and having an outlet to each of said parts to distribute lubricant thereto.

17. In a lubricating system for a vehicle having a spring and a shackle connecting the spring with the vehicle for pivotal swinging movement relative thereof, said vehicle having parts to be lubricated in the locality of the shackle, lubricant impelling pumping mechanism comprising a container, a pump chamber, impelling mechanism connected with the shackle and a part to which the shackle is attached to impel lubricant from the container through an outlet in the pumping mechanism under pressure, and a lubricant conduit leading from such outlet to the shackle and said parts of the vehicle to be lubricated in the locality of the shackle, said conduit having outlets for lubricant to the said parts to be lubricated.

18. In a vehicle having a determined number of shackle members pivotally connected therewith for swinging movement, a plurality of parts to be lubricated grouped about each of said shackles, a lubricant container disposed in proximity each of said shackles, lubricant pumping mechanism communicating with each container to receive lubricant therefrom and having an impeller associated with the adjacent shackle to be operated by the swinging movement thereof to draw lubricant from the container and discharge lubricant under pressure, and a conduit leading from the discharge of said pump to the several parts to be lubricated grouped about the shackle.

19. In a vehicle having a determined number of spring shackles pivotally connected thereto, a plurality of parts to be lubricated grouped about each of said shackles, lubricant pumping mechanism associated with each of said shackles comprising a container for lubricant and an impeller operated by the swinging movement of the shackle relative a part to which it is attached to draw lubricant from the container and exhaust the same, a lubricant passageway leading from the exhaust of said pumping mechanism to each of the parts to be lubricated in the group and the adjacent shackle.

20. In a vehicle having a determined number of spring shackles pivotally connected therewith, a plurality of parts to be lubricated grouped about each shackle, lubricant pumping mechanism for each of said shackle groups comprising a lubricant container and a lubricant pump communicating with the container to receive lubricant therefrom and having an exhaust for lubricant, said pump provided with an impeller connected with the shackle and a part to which the shackle is pivotally associated to be operated by movement of the shackle relative such part to draw lubricant from the container and discharge it through said exhaust, and a conduit for lubricant leading from the exhaust to each of the parts in the group about the shackle for lubrication thereof.

21. In a vehicle lubricating system, a vehicle supported at opposite ends by springs pivotally connected therewith by spring shackles, a plurality of parts to be lubricated grouped about each of a determined number of such shackles, a lubricant dispensing device for each of said shackle groups comprising a container for lubricant, a pump chamber communicating with the lubricant chamber to receive lubricant therefrom and having an exhaust for lubricant, an impeller adapted to draw lubricant from the container into the pump chamber and discharge the same through the exhaust therefrom, said impeller connected with the shackle and a part to which the shackle is attached to be operated by the relative movement thereof, and a lubricant conduit leading from the exhaust of the pump to the shackle and to the several parts to be lubricated grouped about the shackle to distribute lubricant to the shackle and to such parts.

22. In a vehicle lubricating system, a spring supported vehicle chassis, shackles at the four corners of the chassis connecting the springs thereto, said vehicle having a plurality of parts to be lubricated grouped about each of the four shackles, a lubricant dispenser for each shackle described comprising a container for lubricant and pumping mechanism communicating with the container to receive lubricant therefrom and with the parts grouped about the shackle to be lubricated to dispense lubricant thereto, said pumping mechanism operatively connected with the shackle to be actuated by the movement thereof.

23. In a vehicle lubricating system, a spring supported vehicle chassis, shackles at the four corners of the chassis connecting the springs thereto, said vehicle having a plurality of parts to be lubricated grouped about each of the four shackles, a lubricant dispenser for each shackle group communicating with the parts thereof to be lubricated to discharge lubricant thereto and having lubricant pumping mechanism operatively connected with a part pivotally associated with the chassis to be actuated by the swinging movement of such part as the vehicle travels over the road.

24. In a vehicle lubricating system, a wheeled spring-supported vehicle chassis, a plurality of parts to be lubricated grouped about each corner of the chassis, a lubricant dispensing device for each group of parts to be lubricated comprising a container for lubricant communicating with the respective parts to be lubricated to discharge lubricant thereto, and pumping mechanism operable by the movement of the chassis produced by the travel of the vehicle over the road to draw lubricant from the container and discharge it to the parts to be lubricated.

25. In a vehicle lubricating system, a vehicle chassis, springs at each end thereof, a plurality of parts to be lubricated grouped about said springs, a lubricant dispensing device for each of said group of parts to be lubricated, said lubricant dispensing devices connected with the chassis and the said springs to be operated by the relative movement of the chassis and springs produced by the travel of the vehicle over the road to feed lubricant to the several parts to be lubricated thereby.

26. In a lubricating system for a vehicle, a spring-supported chassis, a part to be lubricated, a container for lubricant, a pump chamber having a valve-controlled inlet leading from the container and a valve-controlled outlet to the part to be lubricated, means operable by the relative movement of the spring and chassis as the vehicle travels over the road for producing a variation in pressure in the pump chamber to discharge lubricant therefrom to the part to be lubricated and to draw lubricant from the container thereinto.

27. In a lubricating system for a vehicle, a chassis, a spring pivotally associated therewith, a part to be lubricated, a container for lubricant, a pump chamber having a valve-controlled intake leading from the container and a valve-controlled outlet to the part to be lubricated, a pump plunger operable by the relative movement of the spring and chassis for creating a variation in pressure in the pump chamber to draw lubricant thereinto from the container and for forcing the lubricant therefrom under pressure to the part to be lubricated.

28. In a lubricating system for a vehicle chassis having a supporting spring and a part to be lubricated, a lubricant container, pump mechanism comprising a pump chamber connected with the container to receive lubricant therefrom and having a discharge to the part to be lubricated, and lubricant impelling mechanism connected with the spring and the part of the chassis relative which the spring is movable to be actuated by the movement of the spring relative such part to draw lubricant from the container into the pump chamber and force the same therefrom to the part to be lubricated, and adjustable means for varying the pump action.

29. In a lubricating system for a road vehicle, a chassis having a supporting spring and a part to be lubricated, a container for lubricant, pump mechanism comprising a pump chamber connected with the container for lubricant to receive lubricant therefrom and with the part to be lubricated to discharge lubricant thereto, and lubricant impelling mechanism operable by the relative movement of the spring and the part of the chassis to which the spring is attached produced by the travel of the vehicle over the road to draw lubricant from the container into the pump chamber and discharge it therefrom under pressure to the part to be lubricated, and adjustable means for varying the discharge of lubricant from said pump as produced by such travel.

In testimony whereof, I sign this specification.

GEORGE R. SIEGRIST.